United States Patent
Schnaibel et al.

(10) Patent No.: US 6,745,559 B1
(45) Date of Patent: Jun. 8, 2004

(54) METHOD FOR OPERATING AND INTERNAL COMBUSTION ENGINE, IN PARTICULAR OF A MOTOR VEHICLE

(75) Inventors: Eberhard Schnaibel, Hemmingen (DE); Erich Schneider, Kirchheim (DE); Andreas Koring, Ludwigsburg (DE); Andreas Blumenstock, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 231 days.

(21) Appl. No.: 09/914,672

(22) PCT Filed: Nov. 24, 2000

(86) PCT No.: PCT/DE00/04169
§ 371 (c)(1),
(2), (4) Date: Feb. 12, 2002

(87) PCT Pub. No.: WO01/49993
PCT Pub. Date: Jul. 12, 2001

(30) Foreign Application Priority Data

Dec. 31, 1999 (DE) .......................... 199 63 903

(51) Int. Cl.⁷ .................... F01N 3/20; G06F 19/00
(52) U.S. Cl. .................... 60/274; 60/277; 701/114
(58) Field of Search .................... 60/274, 276, 277, 60/284, 285; 701/101, 102, 103, 114, 115

(56) References Cited

U.S. PATENT DOCUMENTS

| 5,400,592 A | * | 3/1995 | Mukaihira et al. ............. 60/274 |
| 5,419,122 A | | 5/1995 | Tabe et al. ..................... 60/274 |
| 5,526,643 A | * | 6/1996 | Mukaihira et al. ............. 60/276 |
| 5,556,604 A | | 9/1996 | Zahn et al. ................ 423/213.7 |
| 5,610,844 A | * | 3/1997 | Maus et al. ..................... 60/277 |
| 5,630,315 A | * | 5/1997 | Theis ............................ 60/274 |
| 5,729,971 A | | 3/1998 | Matsuno et al. ............... 60/277 |
| 5,732,551 A | * | 3/1998 | Naber et al. ................... 60/274 |
| 5,761,901 A | * | 6/1998 | Staufenberg et al. .......... 60/274 |
| 5,787,705 A | * | 8/1998 | Thoreson ...................... 60/274 |
| 5,862,661 A | * | 1/1999 | Zhang et al. .................. 60/274 |

FOREIGN PATENT DOCUMENTS

| DE | 197 14 293 | 3/1998 |
| DE | 197 29 087 | 1/1999 |
| DE | 198 11 574 | 9/1999 |
| EP | 0756072 | 1/1997 |
| JP | 05 312024 | 11/1993 |
| JP | 08 082213 | 3/1996 |
| JP | 08 177469 | 7/1996 |

OTHER PUBLICATIONS

"Methods for Monitoring and Diagnosing the Efficiency of Catalytic Converters—A Patent Oriented Survey (Hitachi Ltd)", 1998, Elsevier B.V., Amsterdam, pp. 145 to 160.

* cited by examiner

Primary Examiner—Willis R. Wolfe
(74) Attorney, Agent, or Firm—Walter Ottesen

(57) ABSTRACT

An internal combustion engine, especially for a motor vehicle, is described, which is provided with a catalytic converter which can be charged with hydrocarbons. The converting capability of the catalytic converter can be determined by a control apparatus. The converting capability of the catalytic converter is determined by the control apparatus by means of a combination of a passive and an active diagnostic method (27, 31).

10 Claims, 2 Drawing Sheets

METHOD FOR OPERATING AND INTERNAL COMBUSTION ENGINE, IN PARTICULAR OF A MOTOR VEHICLE

FIELD OF THE INVENTION

The invention relates to a method for operating an internal combustion engine, especially of a motor vehicle, wherein a catalytic converter is charged with hydrocarbons and wherein the conversion capability of the catalytic converter is determined. Likewise, the invention relates to a control apparatus for an internal combustion engine, especially of a motor vehicle, as well as an internal combustion engine especially for a motor vehicle.

BACKGROUND OF THE INVENTION

A method of this kind, a control apparatus of this kind and an internal combustion engine of this kind are, for example, known for a so-called intake manifold injection. There, the fuel is injected into the intake manifold of the engine during the induction phase. The hydrocarbons developed during the combustion of the fuel are converted, inter alia, into carbon dioxide in the catalytic converter. It is known that the catalytic converter is subjected to deterioration which leads to a limiting of its converting capability.

The method mentioned initially herein is also known from a direct-injecting internal combustion engine. There, the fuel is injected directly into the combustion chamber of the engine, inter alia, during the induction phase. The arising exhaust gases are purified by a downstream catalytic converter.

SUMMARY OF THE INVENTION

It is an object of the invention to provide a method for operating an internal combustion engine with which the deterioration of the catalytic converter is detected.

This object is achieved in accordance with the invention in a method of the above-mentioned type in that the converting capability of the catalytic converter is determined by means of a combination of a passive and of an active diagnostic method. The task is correspondingly solved in a control apparatus and an internal combustion engine of the respective types referred to above. The present invention can be utilized in the same manner for an intake manifold injection as for a direct-injecting internal combustion engine.

With the passive diagnostic method, it is possible to recognize the conversion capability and therefore the state of deterioration of the catalytic converter rapidly and without an effect on the control (open loop and/or closed loop) of the engine. However, if the catalytic converter is in a transition region between good converting capability and poor converting capability, the passive diagnostic method is supplemented or replaced by an additional active diagnostic method. This active method can recognize the conversion capability very accurately and can thereby recognize the deterioration of the catalytic converter.

In total, with the invention, a method is provided with which the deterioration of the catalytic converter can be determined rapidly but nevertheless very precisely and a necessary exchange of the catalytic converter can be reliably detected.

In an advantageous further embodiment of the invention, respective indices for the conversion capability of the catalytic converter are generated with the passive and the active diagnostic methods, respectively, which are applied by an evaluation for determining the conversion capability. This index for the conversion capability can be based especially on a comparison of a measurement quantity and a reference quantity. The measurement quantity can, for example, be a temperature of the exhaust gas downstream of the catalytic converter.

It is especially advantageous when an activation signal is generated by the passive diagnostic method when the conversion capability of the catalytic converter lies in the transition region from good to poor. Here, the active diagnostic method is preferably activated by the activation signal. In this way, it is possible in a simple manner to bring the active diagnostic method into use precisely when the passive diagnostic method does no longer ensure an adequate accuracy. The interventions, which are required in the active diagnostic method, are then limited to a minimum in the control (open loop and/or closed loop) of the engine.

In an advantageous further embodiment of the invention, the index for the conversion capability of the catalytic converter, which is generated by the active diagnostic method, is preferred over the index, which is generated by the passive diagnostic method. Alternatively, it is likewise possible that a supplementation takes place, for example, in the sense of a weighting or the like.

Of special significance is the realization of the method of the invention in the form of a control element which is provided for a control apparatus of an internal combustion engine, especially of a motor vehicle. A program is stored on the control element which can be run on a computing apparatus, especially on a microprocessor, and is suitable for executing the method in accordance with the invention. In this case, the invention is therefore realized by a program stored on the control element so that this control element, which is provided with the program, defines the invention in the same way as the method for whose execution the program is suitable. As a control element, an electric storage medium is especially applicable, for example, a read-only-memory or a flash memory.

Further features, possibilities of application and advantages of the invention will become apparent from the description of the embodiments of the invention which follow and which are shown in the figures of the drawing. All described or illustrated features form the subject matter of the invention individually or in any combination independently of the composition thereof in the patent claims or their dependency as well as independently of their formulation in the description or their illustration in the drawing.

BRIEF DESCRIPTION OF THE DRAWINGS

The invention will now be described with reference to the drawings wherein.

DESCRIPTION OF THE PREFERRED EMBODIMENT OF THE INVENTION

Figure 1:
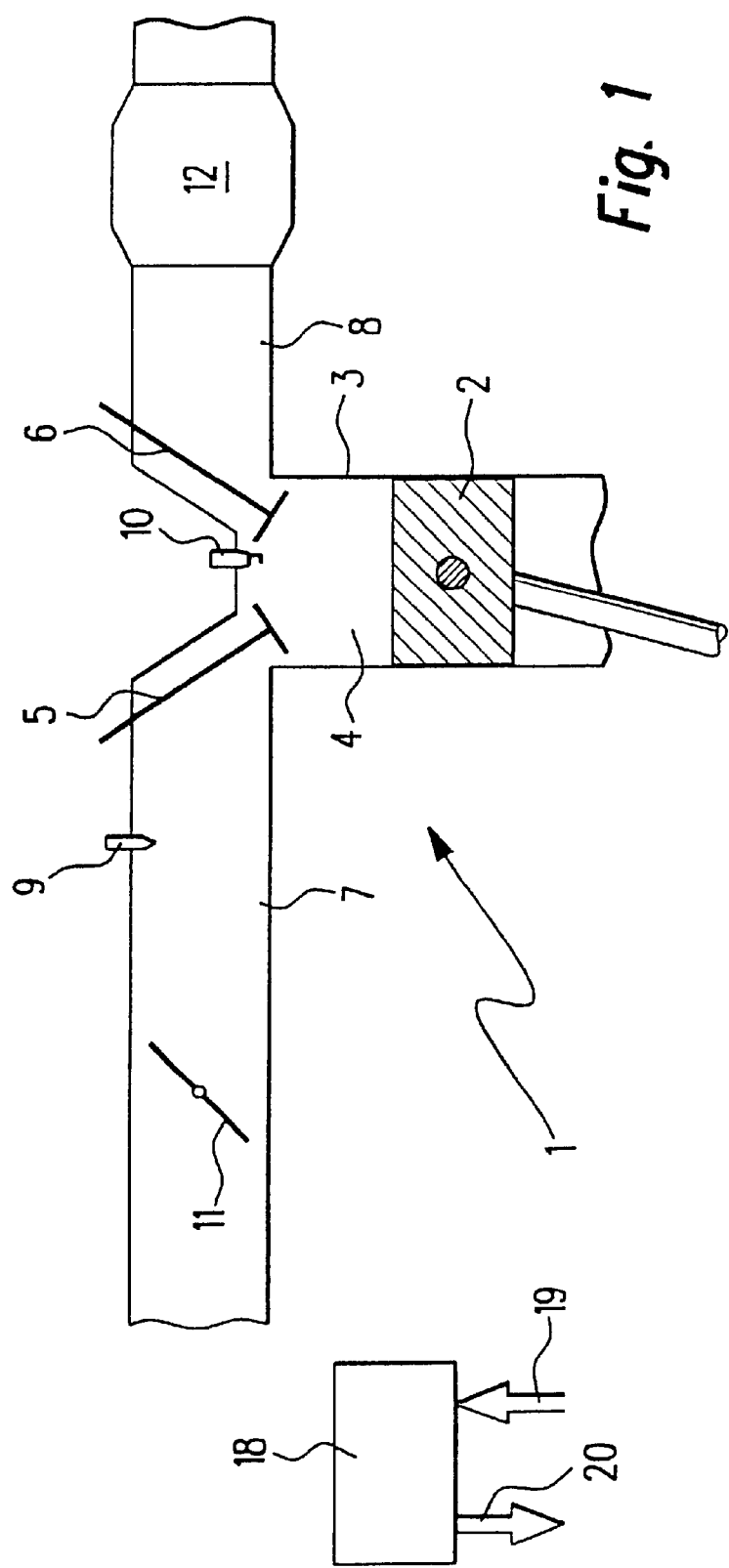
FIG. 1 shows a schematic illustration of an embodiment of an internal combustion engine according to the invention; and, FIG. 2 shows a schematic block diagram of a method of the invention for operating the engine of FIG. 1.

In FIG. 1, an internal combustion engine 1 of a motor vehicle is illustrated wherein a piston 2 is movable back and forth in a cylinder 3. The cylinder 3 is provided with a combustion chamber 4 which, inter alia, is delimited by the piston 2, an inlet valve 5 and an outlet valve 6. An intake manifold 7 is coupled to the inlet valve 5 and an exhaust-gas pipe 8 is coupled to the outlet valve 6.

An injection valve 9 is present in the intake manifold 7. A spark plug 10 projects into the combustion chamber 4 in the region of the inlet valve 5 and outlet valve 6. Fuel can be injected into the intake manifold 7 via the injection valve 9. The inducted air/fuel mixture can be ignited in the combustion chamber 4 with the spark plug 10.

A rotatable throttle flap 11 is accommodated in the intake manifold 7. The quantity of the air supplied to the combustion chamber 4 is dependent upon the angular position of the throttle flap 11. A catalytic converter 12 is accommodated in the exhaust-gas pipe 8 and functions to purify the exhaust gas arising from the combustion of the fuel.

The catalytic converter 12 is a three-way catalytic converter in the present case of an intake manifold injection. The catalytic converter 12 is provided to convert hydrocarbons (HC) into, inter alia, carbon dioxide.

Input signals 19 are applied to the control apparatus 18 and represent operating variables of the engine 1 measured by sensors. The control apparatus 18 generates output signals 20 with which the performance of the engine 1 can be influenced via actuators or positioning devices. The control apparatus 18 is provided, inter alia, for controlling (open loop and/or closed loop) the operating variables of the engine 1. For this purpose, the control apparatus 18 is provided with a microprocessor which has a program stored in a storage medium, especially in a flash memory. The program is suitable for executing the above-mentioned control (open loop and/or closed loop).

Hydrocarbons develop during operation of the engine 1 and the catalytic converter 12 is charged therewith. These hydrocarbons are converted via the catalytic converter 12 into carbon dioxide. The continuous conversion leads to a limiting of the conversion capability of the catalytic converter 12 which is referred to in the following as deterioration.

The converting capability of the catalytic converter 12 can be determined with passive and active diagnostic methods.

In a passive diagnostic method, it is possible to consider a catalytic converter, which is to be investigated, either as not deteriorated or as deteriorated. A condition precedent for this is that the catalytic converter exhibits either a good converting capability or a poor converting capability. However, if the converting capability is just in the transition region from good to poor, then a conclusion as to the deterioration of the catalytic converter cannot be drawn or only be drawn very unreliably with a passive method. With a passive method, catalytic converters can therefore only be checked during the first part of their service life, that is, in a substantially non-deteriorated condition. Thereafter, a passive diagnostic method is too imprecise.

In a passive diagnostic method, it is possible to consider a catalytic converter, which is to be investigated, either as not deteriorated or as deteriorated. A condition precedent for this is that the catalytic converter exhibits either a good converting capability or a poor converting capability. However, if the converting capability is just in the transition region from good to poor, then a conclusion as to the deterioration of the catalytic converter cannot be drawn or can only be drawn very unreliably with a passive method. With a passive method, catalytic converters can therefore only be checked during the first part of their service life, that is, in a substantially non-deteriorated condition. Thereafter, a passive diagnostic method is too imprecise.

In an active diagnostic method it is possible to consider a catalytic converter to be investigated very precisely either as not deteriorated or as deteriorated.

In an active diagnostic method, the exhaust gas composition of the engine is changed in a targeted manner. This can generally take place via a change of the operating point of the engine. It is especially possible to generate a rich exhaust gas at the output of the combustion chamber of the engine which can be achieved with an additional injection after a combustion and/or via a rich operation of several cylinders. With measures of this kind, an additional conversion by the catalytic converter is achieved which can be determined, for example, based on a temperature increase of the exhaust gas which results therefrom. This exhaust gas flows out of the catalytic converter. This temperature increase can be applied as an index for the converting capability of the catalytic converter.

As mentioned, it is possible with an active diagnostic method to precisely determine the converting capability and therefore the deterioration of the catalytic converter. At the same time, the change of the exhaust gas composition has to be ensured again in any way for an active method.

Figure 2:
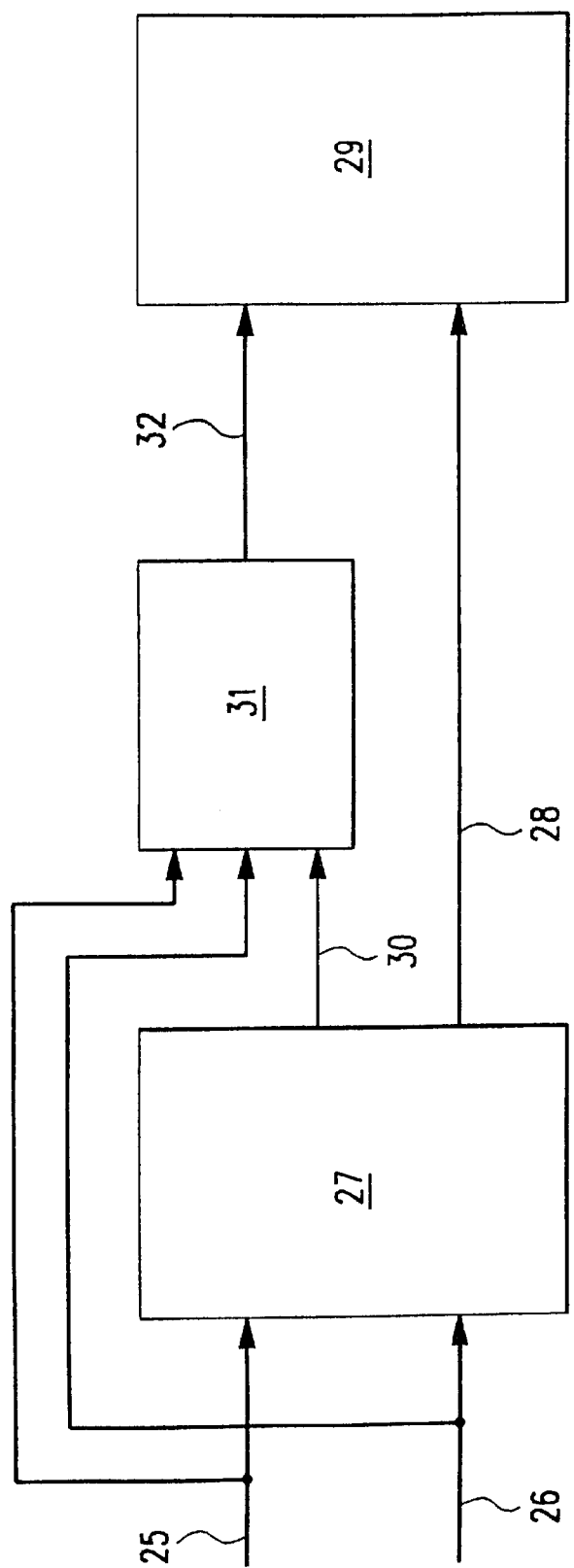

In FIG. 2, a method for operating the engine 1 is shown with which the conversion capability of the catalytic converter 12 is determined by means of a combination of a passive and an active diagnostic method. The method is carried out by the control apparatus 18 in time-dependent intervals or as a consequence of pregiven events.

A measurement quantity 25 and a reference quantity 26 are supplied to a passive diagnostic method 27. The measurement quantity 25 can be, for example, the output signal of a temperature sensor which, for example, is mounted at the output of the catalytic converter 12. The reference quantity 26 can especially be an output signal, which was measured by the above-mentioned sensor at a reference catalytic converter and was then stored in the control apparatus 18.

An index 28 for the converting capability of the catalytic converter 12 is determined from the passive diagnostic method 27 in dependence upon the measurement quantity 25 and the reference quantity 26. This index 28 is transmitted to an evaluation 29 which decides in dependence upon the index 28 whether the catalytic converter 12, based on its deterioration, must be exchanged or not.

As was explained, a clear decision as to the state of deterioration of the catalytic converter 12 can be made on the basis of the passive diagnostic method 27 only when the converting capability of the catalytic converter does not lie in the transition region from good to poor. If this, however, is the case, then this is recognized by the passive diagnostic method 27. An activation signal 30 can then be transmitted to an active diagnostic method 31. The index 28 for the converting capability, which is determined by the passive diagnostic method, continues to be then transmitted to the evaluation 29.

An index 32 for the converting capability of the catalytic converter 12 is determined by the active diagnostic method in dependence upon the measurement quantity 25 and the reference quantity 26. This index 32 is transmitted to the evaluation 29. In this way, the index 28 of the passive diagnostic method and the index 32 of the active diagnostic method are present at the evaluation 29.

The evaluation decides as to the conversion capability in dependence upon the index 28 and the index 32 and thereby as to the state of deterioration of the catalytic converter 12. A weighting of the two input quantities can be undertaken or the index 32 of the active diagnostic method is simply always preferred to the index 28 of the passive diagnostic method.

If the activation signal 30 is not active, then the active diagnostic method 31 generates no output signal so that only the index 28, which is generated by the passive diagnostic method 27, is processed by the evaluation 29 for the conversion capability of the catalytic converter 12.

What is claimed is:

1. A control apparatus for an internal combustion engine including an engine of a motor vehicle, the internal combustion engine having a catalytic converter, the control apparatus comprising:

means for charging a catalytic converter with hydrocarbons;

means for determining the conversion capability of said catalytic converter with a combination of a passive diagnostic method and an active diagnostic method by carrying out said passive diagnostic method and, when no clear result is obtained as to said conversion capability of said catalytic converter, then carrying out said active diagnostic method;

means for generating indices for said conversion capability of said catalytic converter with said passive and active diagnostic methods, respectively; and, means for undertaking a weighting of said indices to determine said conversion capability of said catalytic converter.

2. An internal combustion engine including an engine for a motor vehicle, the engine comprising:

a catalytic converter; and, a control apparatus including:

means for charging a catalytic converter with hydrocarbons;

means for determining the conversion capability of said catalytic converter with a combination of a passive diagnostic method and an active diagnostic method by carrying out said passive diagnostic method and, when no clear result is obtained as to the conversion capability of said catalytic converter, then carrying out said active diagnostic method;

means for generating indices for said conversion capability of said catalytic converter with said passive and active diagnostic methods, respectively; and, means for undertaking a weighting of said indices to determine the conversion capability of said catalytic converter.

3. A method for operating an internal combustion engine including an engine of a motor vehicle, the method comprising the steps of:

charging a catalytic converter with hydrocarbons;

determining the conversion capability of said catalytic converter with a combination of a passive diagnostic method and an active diagnostic method by carrying out said passive diagnostic method and, when no clear result is obtained as to the conversion capability of said catalytic converter, then carrying out said active diagnostic method;

generating indices for said conversion capability of said catalytic converter with said passive and active diagnostic methods, respectively; and, undertaking a weighting of said indices to determine said conversion capability of said catalytic converter.

4. The method of claim 3, wherein each of said indices for said conversion capability of said catalytic converter is generated in dependence upon the measurement quantity and a reference quantity.

5. The method of claim 3, further comprising the step of generating an activation signal from said passive diagnostic method when said conversion capability of said catalytic converter lies in the transition region from good to poor.

6. The method of claim 5, wherein said active diagnostic method is activated by said activation signal.

7. A memory element including a flash memory for a control apparatus of an internal combustion engine including an engine of a motor vehicle, the memory element comprising a program stored thereon which can be run on a computing apparatus including on a microprocessor, and said program being suitable for executing a method for operating an internal combustion engine including an engine of a motor vehicle, the method including the steps of:

charging a catalytic converter with hydrocarbons;

determining the conversion capability of said catalytic converter with a combination of a passive diagnostic method and an active diagnostic method by carrying out said passive diagnostic method and, when no clear result is obtained as to the conversion capability of said catalytic converter, then carrying out said active diagnostic method;

generating indices for said conversion capability of said catalytic converter with said passive and active diagnostic methods, respectively; and, undertaking a weighting of said indices to determine said conversion capability of said catalytic converter.

8. The memory element of claim 7, wherein each of said indices for said conversion capability of said catalytic converter is generated in dependence upon the measurement quantity and a reference quantity.

9. The memory element of claim 7, said program being suitable for executing the method step of generating an activation signal from said passive diagnostic method when said conversion capability of said catalytic converter lies in the transition region from good to poor.

10. The memory element of claim 9, wherein said active diagnostic method is activated by said activation signal.

* * * * *